…

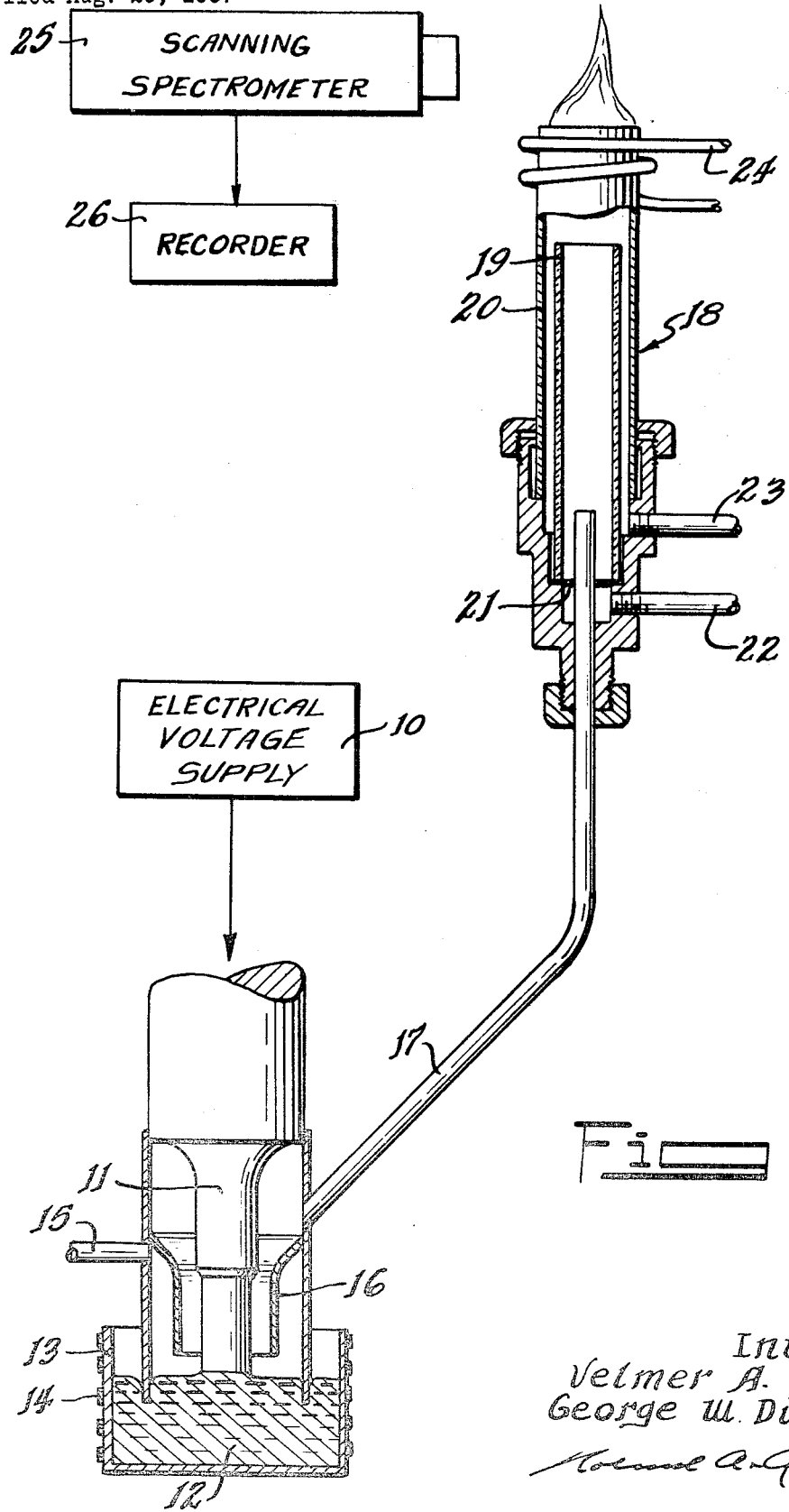

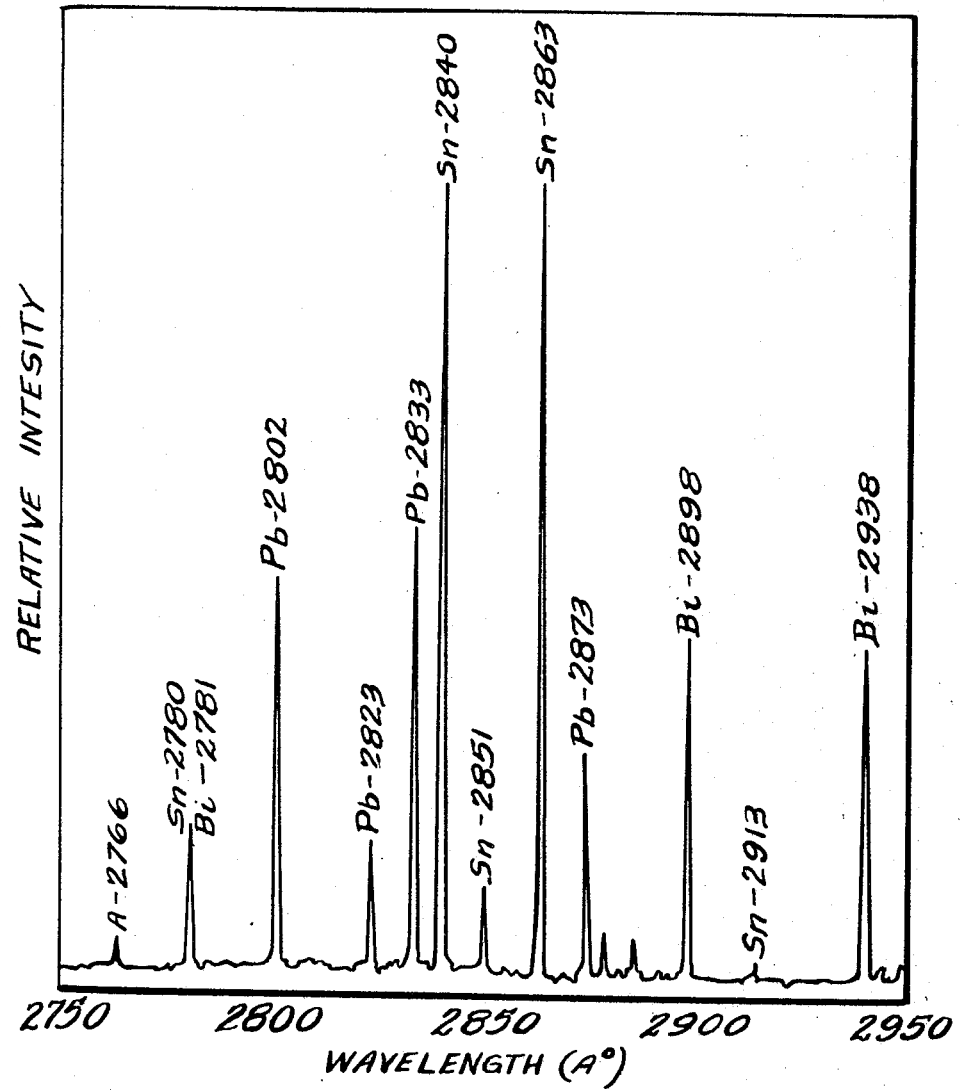

United States Patent Office 3,521,959
Patented July 28, 1970

3,521,959
METHOD FOR DIRECT SPECTROGRAPHIC ANALYSIS OF MOLTEN METALS
Velmer A. Fassel and George W. Dickinson, Ames, Iowa, assignors to the United States of America as represented by the United States Atomic Energy Commission
Filed Aug. 29, 1967, Ser. No. 664,225
Int. Cl. B05b 17/06; G01n 21/56
U.S. Cl. 356—85    1 Claim

ABSTRACT OF THE DISCLOSURE

Method and apparatus for direct spectrographic analysis of molten metals. The molten metal is nebulized by an ultrasonic transducer provided with a probe which is in contact with the surface of the molten metal. The droplets of molten metal are carried to a plasma torch by a stream of gas which is at a temperature such that the droplets solidify quickly. Conventional spectrographic equipment is employed to obtain the spectrum of the metal.

CONTRACTUAL ORIGIN OF THE INVENTION

The invention described herein was made in the course of, or under, a contract with the United States Atomic Energy Commission.

BACKGROUND OF THE INVENTION

This invention relates to the direct spectrographic analysis of molten metals. In more detail, the invention relates to spectrographic analysis of molten metals employing ultrasonics to nebulize the molten metal.

Emission spectroscopy has long been utilized for the analysis of metals. The metals are normally analyzed directly, using spark excitation of metal self electrodes. The precision of these analysis is usually acceptable. However, sample history is an important factor in the direct analysis of metals, particularly when high precision and accuracy are desired. Changes in crystalline form can cause variations in excitation, impurities and alloying elements may not be distributed homogeneously throughout the sample, variations in the physical character of the metal surface can cause variations in excitation from sample to sample, and those impurities or alloying elements which are chemically bound to other elements in the metal may not be excited to the same extent as those which are not chemically bound.

To eliminate the above problems, samples are often dissolved and the resulting solution analyzed by spark or flame excitation. Precision and accuracy are acceptable, but dilution of the sample often eliminates the possibility of determinng low-level impurities.

Both of the above types of analysis involve the time-consuming process of sample preparation. Dissolution techniques, of course, usually require the greatest amount of time. In the direct analysis of metals, there is still a considerable time lapse between the actual manufacturing process of the metal or alloy in molten form and the analysis of the solid metal.

For many manufacturing processes the ideal analysis would thus be the direct examination of the molten metal. The primary problem with direct molten metal analysis is the transfer of the sample into the excitation source in a form such that the sample can be vaporized and excited by the source.

SUMMARY OF THE INVENTION

This is accomplished in accordance with the present invention by nebulizing the molten metal and transporting the resulting aerosol into an excitation source. Nebulization of the molten metal can be and preferably is carried out ultrasonically and the excitation source can be and preferably is an induction-coupled argon-supported plasma torch.

BRIEF DESCRIPTION OF THE DRAWING

FIG. 1 is a schematic view of apparatus used in the practice of the present invention.
FIG. 2 shows a representative portion of a spectrum obtained in practicing this invention.

DESCRIPTION OF THE PREFERRED EMBODIMENT

As shown in the drawing, an alternating current voltage supply 10 energizes an ultrasonic transducer provided with a probe 11 which is in contact with the surface of a pool 12 of molten metal located in container 13, so that ultrasonic energy is directed on to the surface of the pool. When ultrasonic energy encounters the surface of a liquid, capillary waves are produced. If the ultrasonic energy is high enough, the amplitude of the capillary waves will be sufficient to cause rupture of the liquid surface to produce small-diameter droplets. Container 13 is provided with a heater 14 to maintain the metal in container 13 in molten condition.

A gas stream admitted through inlet 15 is directed downwardly over the surface of the pool 12 of molten metal by baffle 16. The gas stream entrains the droplets of metal which quickly solidify and the aerosol thus formed is directed through line 17 to plasma torch 18.

Plasma torch 18 comprises coaxial tubes 19 and 20, inner tube 19 and outer tube 20 being formed of quartz. Line 17 is formed of borosilicate glass and is coaxial with inner tube 19.

A gas which serves to support and stabilize the plasma is introduced into inner tube 19 through screen 21 from inlet line 22 while a coolant gas—which may be the same gas—is introduced into outer tube 20 through inlet line 23. A radio frequency coil 24 surrounds tube 20 just above the top of tube 19. A scanning spectrometer 25 and recorder 26 are employed to obtain the spectrum of the metal.

In operation, ultrasonic probe 11 causes droplets of molten metal to form. These droplets are swept from the pool 12 of molten metal by gas introduced through inlet 15 and the resulting aerosol directed into the plasma torch 18 through line 17. The gas introduced through line 22 and the gas from line 17 rise in inner tube 19 to be inductively heated by radiofrequency coils 24 to a very high temperature. The aerosol particles are swept into the plasma, vaporized, and the atoms of the metal excited to higher energy levels. Conventional spectrographic equipment is then employed to obtain the spectrum of the meal.

The following is a description of one example of the invention. Woods metal—an alloy of 50% bismuth, 25% lead, 12.5% tin and 12.5% cadmium—was melted by heater 14 in container 13. The metal was nebulized by an ultrasonic powered probe 11, the tip of which was in contact with the molten metal surface. The probe tip was a titanium-iridium alloy step horn powered by a Biosonik–II, 20-kc. generator. The resulting aerosol was transported by argon gas into argon-supported induction-coupled plasma torch 18. The spectrum produced was observed photoelectrically with an 0.5-meter Ebert scanning spectrophotometer. The following table shows the experimental conditions during the experiment.

INSTRUMENTAL CONDITIONS

R.F. generator:
- Filament voltage—12.6 volts
- Grid current—0.4 amp
- Plate current—1.7 amps
- Frequency—~3.4 mc.

Plasma torch:
- Coolant gas flow—23 1/min. A
- Plasma support gas flow—1.6 1/min. A
- Aerosol gas flow—2.0 1/min. A Ultrasonic generator:
- Power level—45%

Spectrometer:
- Plasma region observed—50 mm. above coil
- Spectral region observed—2740–2950 A.
- Scan speed—20 A./min.

Recorder:
- Amplifier—$10 \times 10^{-9}$
- Phototube—1,200 volts
- Chart speed—1 in./min.

The maximum amount of aerosol was produced when the probe tip was just on contact with the molten metal surface. If the probe tip is below the surface, cavitation results and no aerosol is produced. Likewise, if the probe tip is above the surface, little or no aerosol is produced. Thus positioning of the probe tip is critical.

It was evident that the prime requisite for transporting a molten metal aersol is that the droplets solidify as soon as possible following nebulization. Otherwise, the droplets coalesce, thus falling back into the melt, and deposit on the walls of the container. Solidification of the droplets is assured by maintaining the temperature of the gas introduced into line 15 several degrees below the melting temperature of the metal. Since Wood's metal, which has a melting point of 70° C. solidified rapidly, this nebulization techniques should be applicable to all but the very low melting point metals such as mercury or gallium.

The induction-coupled plasma is an ideal excitation source for molten metal aerosols since it is maintained by a flow of gas which is necessary to transport the resulting powder. The plasma is also a stable, high-energy, high-temperature excitation source with the added advantage of being isolated and, thus, contamination-free.

A representative portion of the spectrum for Wood's metal obtained with the assembly described is shown in FIG. 2. The particular wavelength region shows was chosen because of the numerous emission lines of several sample components in that region. It is thus evident from FIG. 2 that spectral lines of strong intensity were obtained from the molten metal sample.

Enhanced line intensity can be obtained by employing a higher frequency ultrasonic generator, of which there are several commercially available, since aerosol droplet diameter is inversely proportional to the frequency and more of the smaller diameter aerosol is then transported to the plasma. Also the use of a higher and variable-frequency induction-coupled plasma generator would also increase the emission intensity. A plasma produced by such a generator can tolerate more sample due to the availability of inoperation impedance matching. Higher gas flow rates can also be used, which would introduce even more sample into the plasma.

While an argon-supported induction-coupled plasma torch has been described as the excitation source, it will be apparent that the specific excitation source employed is not critical to the invention. For example, the gas need not be an inert gas and it may be that other gases would be preferable. Also any source can be used to which the aerosol stream can be presented.

Other means of nebulizing the molten metal could also be used. One possibility for metals and alloys which melt at relatively high temperature would be to focus a plurality of ultrasonic transducers through an oil bath or other heat-transfer medium on the target metal.

Another possibility would be intermittent nebulization to conserve the tip and the polarization of the transducer. This could be accomplished by causing the probe tip to make intermittent contact with the melt.

Application of ultrasonics to the nebulization of molten or liquid materials for direct spectrographic analysis could not only be used as a general laboratory tool but could also be applied for continuous or on-stream analysis on an industrial scale. The preponderant application would be for the direct analysis of molten metals and alloys such as iron, steel, aluminum, brass, etc., during the refining and alloying process.

The embodiments of the invention in which an exclusive property or privilege is claimed are defined as follows:

1. A method of analyzing a metal to determine the constituents thereof comprising the steps of liquefying said metal, mounting an ultrasonic probe to engage said liquefied metal only at the surface thereof, exciting said ultrasonic probe to generate capillary waves on the surface of said liquefied metal and nebulize said liquefied metal into droplets, entraining said droplets in a stream of gas wherein the droplets solidify to form an aerosol, directing said aerosol into an emission source, and spectrographically analyzing the light from said emission source.

References Cited

UNITED STATES PATENTS 3,325,976 6/1967 West ---------------- 239—102

OTHER REFERENCES

Analytical Chemistry, "Radiofrequency Plasma Emission Spectrometer," vol. 36, No. 2, February 1964, pp. 412–415, West et al.

Ultrasonics—Carlin, McGraw-Hill Book Company, 1960, pp. 240–244.

High-Intensity Ultrasonics—Brown et al., London, ILIFFE Books Ltd., 1965, p. 217.

RONALD L. WIBERT, Primary Examiner

V. P. McGRAW, Assistant Examiner

U.S. Cl. X.R.

55—249; 239—4; 356—187